United States Patent [19]

Shaw

[11] 4,046,946

[45] Sept. 6, 1977

[54] LITHOGRAPHIC PRINTING PLATE

[75] Inventor: Michael J. Shaw, Kalamazoo, Mich.

[73] Assignee: Allied Paper Incorporated, Kalamazoo, Mich.

[21] Appl. No.: 634,899

[22] Filed: Nov. 24, 1975

Related U.S. Application Data

[63] Continuation-in-part of Ser. No. 493,528, Aug. 1, 1974, Pat. No. 3,922,441.

[51] Int. Cl.[2] .......................... B41C 1/10; B41N 1/08; B32B 13/08

[52] U.S. Cl. .................................... 428/325; 101/460; 101/462; 427/372 A; 427/391; 428/328; 428/330; 428/331; 428/341; 428/342; 428/446; 428/452; 428/454; 428/537

[58] Field of Search ............... 428/446, 454, 325, 328, 428/331, 330, 537, 452, 219, 340, 341, 342; 101/460, 462; 427/372 A, 391

[56] References Cited

U.S. PATENT DOCUMENTS

| | | | |
|---|---|---|---|
| 3,007,878 | 11/1961 | Alexander | 106/57 |
| 3,055,295 | 9/1962 | Perkins | 101/462 |
| 3,181,460 | 5/1965 | Perkins | 101/462 |
| 3,220,346 | 11/1965 | Strickler | 101/461 |
| 3,254,597 | 6/1966 | Hart | 101/462 |
| 3,256,810 | 6/1966 | Ensink | 101/462 |
| 3,270,667 | 9/1966 | Perkins | 101/462 |
| 3,455,241 | 7/1969 | Perkins | 101/462 |
| 3,573,236 | 3/1971 | Barlow | 428/454 |

*Primary Examiner*—Ellis Robinson
*Attorney, Agent, or Firm*—Richard H. Thomas

[57] ABSTRACT

The desirable attributes of both a barrier coat and a face coat and elimination of a coating step are obtained in manufacture of a lithographic printing plate having a paper base and a lithographic printing surface thereon, wherein said surface comprises a coating of positively charged colloidal silica and insolubilized hydrophilic polymer, by including in said coating non-flocculating pigment and resinous binder that is cationic or nonionic or mixed cationic and nonionic.

12 Claims, No Drawings

LITHOGRAPHIC PRINTING PLATE

This patent application is a continuation-in-part of U.S. patent application Ser. No. 493,528, filed Aug. 1, 1974, now U.S. Pat. No. 3,922,441 and entitled "Lithographic Printing Plate and Method of Making Same". The teachings of that patent application are incorporated herein by reference.

This invention relates to lithographic printing plates having a paper base, and more particularly a paper base and a lithographic printing surface thereon, which surface comprises a coating of positively charged colloidal silica and insolubilized hydrophilic polymer such as polyvinyl alcohol.

BACKGROUND OF THE INVENTION

Paper base lithographic printing plates and methods for making the same have been well known for a considerable period of time. Lithography depends upon the immiscibility of a greasy lithographic printing ink and an aqueous etch or lithographic solution. In use, a paper lithographic printing plate is first imaged in a known manner with typed, written, or drawn copy material to be reproduced. The image may also be obtained in other ways, for instance, by xerography; e.g. Electrofax (Trademark, Radio Corp. of America) and Xerox (Trademark, Xerox Corp.). The grease-receptive imaging material employed makes the imaged areas ink-receptive and water-repellent (i.e. hydrophobic). The remaining non-imaged surface is water-receptive and ink-repellent (i.e. hydrophilic).

The imaged plate is placed on a plate cylinder of an offset duplicating press. The overall surface of the plate then is treated with an aqueous wet-out liquid which wets all portions of the plate except those areas that have been imaged and are water-repellent. The press inking roll then passes over the surface of the plate and deposits a film of ink only upon the ink-receptive imaged areas. In the printing operation, the ink from the imaged areas is transferred in reverse to a rubber offset blanket which in turn prints directly onto a paper sheet so as to form a copy.

Desirable attributes of a lithographic or planographic printing plate include the producing of clean copy, good toning, good imaging, stop-go properties, and lack of curling or wrinkling of plates while on a press. It is also important that the plate, while accepting ink and etch, be sufficiently water resistant so that it will not "milk" or "pick".

Lithographic printing plates of the type described having a coating of positively charged colloidal silica and insolubilized hydrophilic polymer, conventionally require the application of a substantial barrier cost onto the paper base followed by the application of such silica containing coating, which is commonly called a face coat. Such barrier coat containing a pigment and resin binder provides both surface smoothness and water resistance to the paper base sheet. The barrier coat may be dispensed with for a short run plate, but for medium-to-long run plates (e.g. 1,000–5,000 copies), fairly heavy barrier coats, such as those shown in Serial No. 493,528, advantageously are employed.

SUMMARY OF THE INVENTION

The instant invention is an improvement by which the desirable attributes of both a barrier coat and a face coat, with elimination of a coating step, are obtained in a single coat paper based lithographic printing plate having a lithographic printing surface, which surface comprises a coating of positively charged silica and insolubilized hydrophilic polymer. The improvement comprises including in said single coating a non-flocculating pigment and a resinous binder that is cationic or nonionic or mixed cationic and nonionic. By non-flocculating it is meant that the pigment does not flocculate or coagulate in the coating formulation in which it is included.

DETAILED DESCRIPTION OF THE INVENTION

The suitable positively charged colloidal silica and insolubilized hydrophilic polymers containing face coatings are discussed in Ser. No. 493,528. The introduction into such face coatings of pigment and resinous binder must be controlled carefully in terms of proportions to maintain the lithographic effectiveness of the plate while at the same time securing the advantages of water resistance and surface smoothness conventionally obtained by the use of a barrier coat. Thus, the resinous binder proportion in such single coating or face coating is restricted to 30% at most, but preferably is at least about 5% of such face coating to be practical. In the present invention, in addition to the colloidal silica and insolubilized hydrophilic polymer, is the pigment, which must be restricted to 60% at most of the face coat formulation, but should be at least about 10%. The proportion of positively charged silica should be at least about 10% and can go as high as 70%. The insolubilized hydrophilic polymer (including insolubilizing crosslinking agent if that is used) should be at least about 5%, and not more than 25%, and the ratio of the colloidal silica to such insolubilized hydrophilic polymer should be broadly between about 2:1 and 6:1.

Preferably, these ranges are from about 10 to 20% for the resinous binder, about 30 to 50% for the pigment, about 30 to 50% for the silica, and about 10 to 20% for the insolubilized hydrophilic polymer including cross-linkers therefor, and the ratio of silica to such insolubilized hydrophilic polymer advantageously is about 3:1 to 5:1.

The foregoing weight percentages are based on the dried lithographic printing surface coating; volatiles such as water and fugitive solvents are not considered.

The resinous binder should be cationic or nonionic or a mixture, but it should not be anionic to avoid coagulation. Thus, as a practical matter, resins exhibiting carboxyl functionality should be avoided as, of course, are even stronger acidic funtionalities as sulfonic, phosphonic, etc.

The binders ordinarily are aqueous compounded film-forming latices or suspension polymers, but they also can be powders that are film-forming under plate processing conditions or syrups or solutions of resins in fugitive (effectively vaporizing away at 100° C.) inert solvents such as hydrocarbons, ethers, ketones, and esters. Typical nonionic latices include those of elastomeric butadiene-styrene, polybutadiene, polystyrene (advantageously plasticized, e.g. with dioctyl phthalate or other conventional processing plasticizers), polyamides, acrylic and methacrylic acid esters copolymerized with various vinyl and acrylic monomers such as vinyl chloride, styrene, vinyl toluene, vinyl acetate, various acrylamides, acrylonitriles, etc. Typical aqueous cationic latices and dispersions have amino or quaternary ammonium functionality, for example, polymerized esters of acrylic or methacrylic acids, alkanolamines, and epichlorohydrin. One suitable resin is polyvinylidine chloride made by Dow Chemical Company under the trademark Saran.

The pigment can be any conventional fine particle size pigment, and need not be one commonly employed in the paper coating art. However, it should be non-flocculating in this silica containing face or sole top coat. Accordingly, neutral clay, acid clay, silica, talc, or certain specially treated clays are in order. Anionic clays can be used where they are protected by a stable coating such as a protective colloid, e.g. gum arabic or gelatin or otherwise sheathed to have a cationic or nonionic sheath. The pigment is used to obtain special smoothness filling surface voids, and it also will enhance receptivity of the surface to the ink or etch. One suitable pigment for use in the present invention is titanium dioxide pigment Zopaque RCL-9 (trademark, Glidden-Durkee Division of SCM Corporation) having a particle size (mean particle diameter as determined by electron microscope) of about 0.25 microns.

Clays that are especially dispersible in cationic systems include those that have been hydrolyzed with HCl, then treated with a polyethyleneimine. The pigmentary substances preferably are quite fine, advantageously having average particle size (mean particle diameter) not substantially above about 0.44 microns and generally about 0.20–0.25 microns or slightly less.

Various other additives can be added in minute proportion, e.g. water repellents such as fluoracrylate polymers, salts of low volatility at 100° C., lubricants, water retention aids, and defoamers.

An example of a suitable positively charged or cationic silica which can be employed in accordance with the concepts of the present invention is an aqueous silica sol marketed by E. I. duPont de Nemours and Co. under the registered trademark Ludox 130 M. This silica is stated to have the approximate chemical composition by weight:

% $SiO_2$: 26.0
% $Al_2O_3$: 4.0
% Cl: 1.4
% MgO: 0.2 $Al_2O_3$ being the metal oxide, chlorine being the monovalent anion. The mole ratio of alumina to surface silica is 1:1 (the mole ratio should be in the range 1:2 - 2:1), and the alumina is present as a polymeric coating of the positively-charged Al-O-Al species on the silica coat.

The preparation of the positively-charged colloidal silica (Ludox 130M) is disclosed in U.S. Pat. No. 3,007,878. Essentially, an aquasol of dense silica particles having a surface area of 20 to 600 square meters per gram is mixed with an aqueous solution of a basic salt of a metal having a monovalent anion. e.g. chlorine, wherein the mole ratio of anion to metal atoms is less than (X-2): 1 where X is the valence of the metal. The metal can be any metal having a valence of 3 to 4, and the anion can be any stable monovalent anion other than hydroxyl. Preferred salts are stated to be the chlorides and nitrates of aluminum, zirconium and thorium.

In the method of U.S. Pat. No. 3,007,878, the proportion of salt to silica is such that the mole ratio of metal atoms in the salt to silica in the aquasol is from $2 \times 10^{-5}A : 1$ to $2 \times 10^{-3}A : 1$ where A is the surface area in square meters of the particles in the aquasol.

A preferred hydrophilic polymer is polyvinyl alcohol, although other hydrophilic polymers may be employed. One suitable polyvinyl alcohol is that manufactured by E. I. duPont de Nemours and Co. and marketed under the trademark Elvanol. The polyvinyl alcohol should be at least about 88% hydrolyzed, preferably fully hydrolyzed and preferably also should be of a medium viscosity grade. Another suitable polyvinyl alcohol is one manufactured by the Bordon Co. under the trademark Lemol.

Other suitable hydrophilic colloids include water soluble modified starch (manufactured by Hercules Powder Co. under the trademark Ceron N 4S); corn hull gum, guar gum, dextran, dextrin, carboxymethyl or hydroxymethyl cellulose, polyacrylamide, polyacrylic acid (manufactured by Rohm & Haas Co. under the trademark Acrysol A-3); styrene-maleic anhydride copolymer (manufactured by Texas Butadiene and Chemical Corp. under the trademark, SMA 6000-N); oxidized cornstarch (marketed by National Starch and Chemical Corp. under the trademark Flokote 64).

While the positively charged silica acts as an insolubilizer for the hydrophilic polymer such as polyvinyl alcohol with the heat used in drying the coating, various other crosslinking materials can be utilized in minor proportion if desired, e.g. aminoplasts, phenoplasts, benzene-1,4-bisoxazoline, and the like. For resistance to toning, minor proportions of filler materials such as zirconium acetate, zinc chloride, zinc acetate, and various aluminum silicates can be used (e.g., about 0.5 to 5% of the face coat).

When a single coating is being applied, the amount used is broadly from about 5 to 20 pounds per ream of base paper (3,300 square feet). If a thin barrier coat is used, a lesser amount of face coating can be used (about 2 to 5 pounds per ream). The face coat or single coat can be applied using a rod coater, a roll coater, a knife coater, a size press, or an air knife coater. If a barrier coat is used on the paper, it can be extremely light (3.5 pounds per side per ream), and for efficiency and economy it is applied simply by size press application. Viscosity of any coating used here advantageously is maintained not to exceed about 5000 centipoises at 80° C. and preferably is lower, being not more than about 1000 centipoises, for speed and ease of application.

The following example shows how this improvement can be practiced, but is not to be construed as limiting the invention. In this specification all parts are parts by weight, all percentages are weight percentages, and all temperatures are in degrees Fahrenheit unless otherwise expressly noted.

EXAMPLE 1

An internally sized, wet strength paper base sheet of plain kraft paper, having no barrier coat, has applied to it a coating formulated in accordance with the concepts of the present invention, at the rate of 7.5 pounds per ream of base paper. The coating formulation is as follows:

| | |
|---|---|
| Ludox 130 M (colloidal silica) | 40% |
| Elvanol (polyvinyl alcohol) | 10% |
| Zopaque LDC ($TiO_2$ pigment) | 35% |
| Saran (polyvinylidine chloride) | 15% |
| Total | 100% |

the proportions being based on the dry weight of the coating components absent fugitive solvents and volatiles.

The coating formulation is prepared by first heating the polyvinyl alcohol to about 190° F. for about ½ hour, and then cooling it to about 160° F. The Ludox 130 M is then added and mixed with the polyvinyl alcohol. An aqueous dispersion of the $TiO_2$ pigment, containing about 60–70% pigment, is then added, followed finally by slow addition of the polyvinylidine chloride with agitation. This formulation may be applied as is to the base paper sheet employing any conventional coater.

By the present invention, the desirable properties of both a barrier coat and a face coat are obtained in a single coat application. In other words, the single coating of the present invention is hydrophilic (water receptive and ink repellent) while at the same time is water resistant and has the surface properties offered by a conventional barrier coat. By the invention, a coating step is eliminated significantly reducing the cost of lithographic plates.

I claim:

1. In a lithographic printing plate having a paper base and a lithographic printing surface thereon comprising a face coating of positively charged colloidal silica and insolubilized hydrophilic polymer, in the ratio by weight of about two parts silica:one part polymer to about six parts silica:one part polymer, the improvement for reduction or elimination of a barrier coat on said base which comprises including in the face coating from about 10% to about 60% by weight of a fine particle size pigment which is non-flocculating and about 5% to about 30% by weight of a resinous binder which is cationic, nonionic or mixed cationic and nonionic, the hydrophilic polymer comprising about 5% to about 25% of the face coating and the positively charged colloidal silica comprising about 10% to about 70% by weight of the face coating, said weight percents being based on the dried lithographic printing surface coating free of volatiles.

2. The lithographic printing plate of claim 1 wherein said hydrophilic polymer is polyvinyl alcohol and said nonflocculating pigment is titanium dioxide.

3. The printing plate of claim 1 wherein said pigment has an average particle size not substantially above about 0.44 micron.

4. The printing plate of claim 1 wherein said face coating is applied at the rate of about 2 to about 20 pounds per ream of base paper.

5. The plate of claim 1 wherein the pigment comprises at least one of the following: finely-divided silica, talc, neutral clay, acid clay, and $TiO_2$.

6. The plate of claim 1 wherein the pigment comprises anionic clay protected by a protective colloid.

7. The plate of claim 6 wherein the protective coating for said clay is latently reactable with the positively charged colloidal silica.

8. A method of making a lithographic printing plate which comprises forming an aqueous coating composition comprising an insolubilized hydrophilic polymer, a positively charged colloidal silica, a fine particle size pigment which is nonflocculating, and a resinous binder which is cationic, nonionic or mixed cationic and nonionic, the coating composition having the following approximate proportions by weight:

positively charged colloidal silica: about 10–70%
insolubilized hydrophilic polymer: about 5–25%
non-flocculating pigment: about 10–60%
resinous binder: about 5–30% the ratio of colloidal silica to insolubilized hydrophilic polymer being in the range of about 2:1 to about 6:1; applying said coating composition to a paper base; and drying the coating composition on said paper base.

9. A method of making a lithographic printing plate which comprises forming an aqueous coating composition comprising an insolubilized hydrophilic polymer, a positively charged collidal silica, a fine particle size pigment which is non-flocculating, and a resinous binder which is cationic, nonionic or mixed cationic and nonionic, the coating composition having the following approximate proportions by weight:

positively charged colloidal silica: about 30–50%
insolubilized hydrophilic polymer: about 10–20%
non-flocculating pigment: about 30–50%
resinous binder: about 10–20% the ratio of colloidal silica to insolubilized hydrophilic polymer being in the range of about 3:1 to about 5:1; applying said coating composition to a paper base; and drying the coating composition on said paper base.

10. The method of claim 9 wherein said pigment comprises at least one of the following; finely-divided silica, talc, neutral clay, acid clay and $TiO_2$.

11. The method of claim 9 wherein said coating composition is applied at the rate of about 2–20 pounds per ream of paper base.

12. The method of claim 9 wherein said pigment has an average particle size of not substantially above about 0.44 micron.

* * * * *